No. 640,369. Patented Jan. 2, 1900.
R. R. CROSS.
BATTER MIXER.
(Application filed Apr. 25, 1899.)
(No Model.)

Witnesses
F. H. Schott
Anton A. Hloetzner

Inventor
Rawlan R. Cross
by Frank Burroughs
Attorney

UNITED STATES PATENT OFFICE.

RANSLAR R. CROSS, OF ONEONTA, NEW YORK.

BATTER-MIXER.

SPECIFICATION forming part of Letters Patent No. 640,369, dated January 2, 1900.

Application filed April 25, 1899. Serial No. 714,421. (No model.)

*To all whom it may concern:*

Be it known that I, RANSLAR R. CROSS, a citizen of the United States, and a resident of Oneonta, in the county of Otsego and State of New York, have invented certain new and useful Improvements in Batter-Mixers, of which the following is a full, clear, and exact description, such as will enable those skilled in the art to which it appertains to make and use the same, reference being had to the accompanying drawings, forming a part of this specification.

The invention consists in the novel construction, combination, and arrangement of parts, such as will be hereinafter fully described, pointed out in the appended claims, and illustrated in the accompanying drawings.

Figure 1:
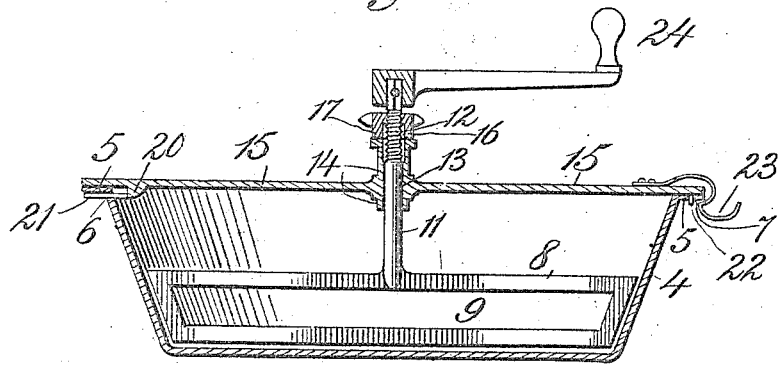
Figure 2:
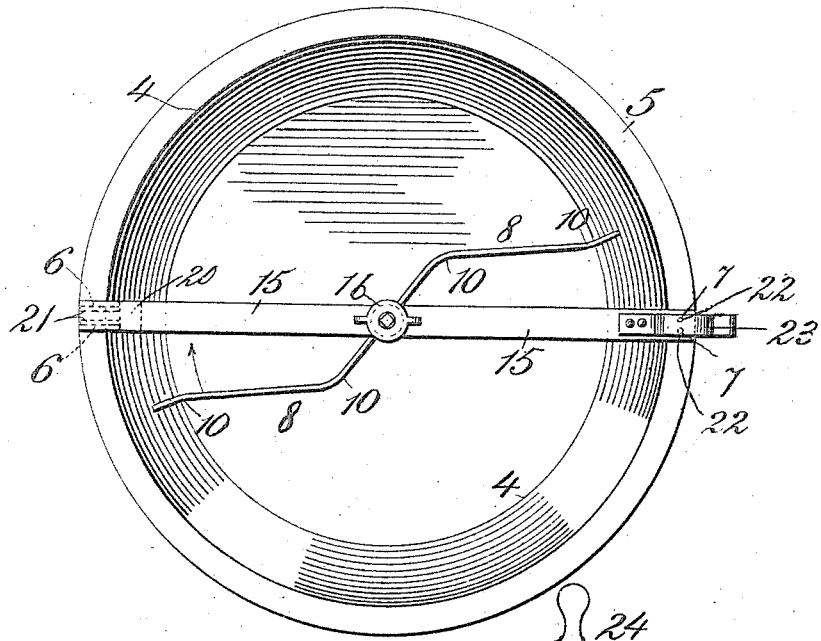
Figure 3:
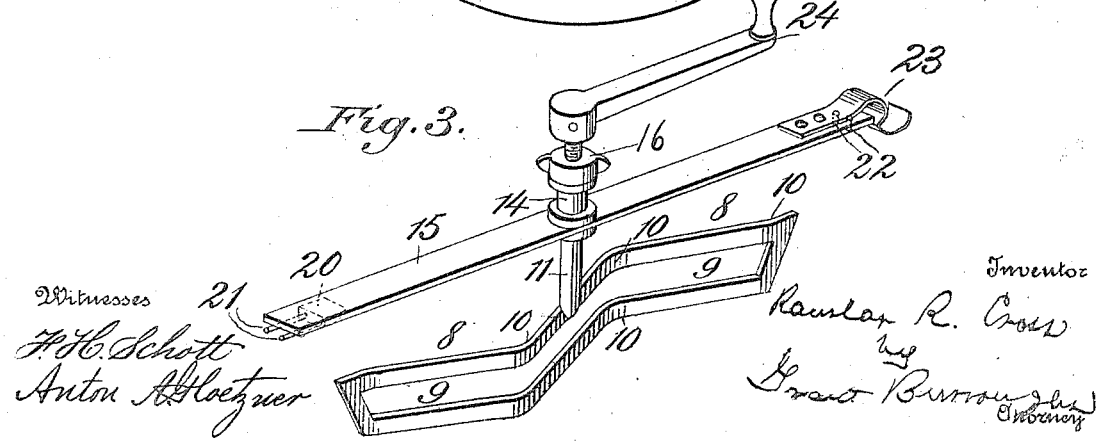

In the accompanying drawings, in which similar reference characters designate corresponding parts, Figure 1 is a transverse vertical sectional view of a device embodying the invention. Fig. 2 is a top plan view of the same, the crank being removed. Fig. 3 is a detail perspective view showing the stirrer and the supporting-bar carrying it.

The main part of the pan or vessel 4 may be of any construction suitable in the premises. However, a flange 5 projects outwardly from the edge of its mouth. In the side of the pan immediately below the flange are the apertures 6. In the flange diametrically opposite the apertures 6 are the openings 7. In the pan is rotatably mounted the stirrer, consisting of the blades 8, having the recess 9. The blades are curved, as at 10, so that they will cause the material being mixed to travel in a substantially circular path rather than be forced outwardly against the side of the pan, as it would be if the blades were straight. The recess 9 allows the blades to pass readily through the material being mixed and thereby facilitates the mixing process.

The stirrer is attached to the lower end of the shaft 11. The latter has its upper end screw-threaded, as at 12, and it is journaled in the bearing 13, formed in the lower end of the sleeve 14, carried by the supporting-bar 15. The shaft 11 passes downwardly through the sleeve and supports the stirrer within the pan. The diameter of the interior periphery of the sleeve at its upper end is greater than that of the screw-threaded portion of the shaft, so that the said screw-threaded portion will not come in contact with the sleeve. On the upper end of the shaft is turned the nut 16, which has projecting from its under side the annular flange 17, adapted to bear on the upper end of the sleeve. The thumb-nut serves to hold the shaft in the sleeve and also permits a vertical adjustment of the shaft. By adjusting the shaft in the sleeve the distance which the stirrer enters the pan can be varied.

The supporting-bar 15 is placed across the mouth of the pan and is provided with means for securing it against accidental displacement. Projecting from the lug 20 on the under side of the supporting-bar at one end are the pins 21. These pins are adapted to engage with the apertures 6 in the side of the pan when the supporting-bar is in position. From the opposite end of the supporting-bar project the pins 22 to engage with the openings 7 in the flange 5. The end of the bar from which the pins 22 project is provided with a spring-clip 23, adapted to engage with the flange to hold the pins 22 in the openings.

To secure the supporting-bar in place, the pins 21 are inserted in the apertures 6 in the side of the pan, with the end of the bar resting on the flange. Then the other end of the bar is moved to bring the pins 22 into register with the openings 7 in the flange. The clip 23 is then forced into engagement with the flange and holds the end of the bar on which it is mounted down against the flange. In this way the bar is securely held in place against accidental displacement; but at the same time it can be readily detached from the pan when it is desired to remove the stirrer.

It is obvious that instead of two openings in the side of the pan and two openings in the flange only one opening in each and a single pin at each end of the bar may be used.

A crank 24 is provided for rotating the stirrer.

Having thus described my invention, what I claim, and desire to secure by Letters Patent, is—

1. In a batter-mixer, a pan having an aperture in its side near its mouth, a flange projecting from the edge of the mouth of said pan and having an opening in the same diametrically opposite the aperture in the side of the pan, a supporting-bar, a pin projecting from one end of said bar and adapted to engage with said aperture in the side of the pan, a pin projecting from the other end of said bar and adapted to engage with the said opening in the flange, a spring-clip on the bar for engaging the flange and a stirrer carried by said bar.

2. In a batter-mixer, a pan, a supporting-bar placed across the mouth of said pan, means for holding said bar thereon to prevent accidental displacement, a sleeve carried by said bar and having a bearing formed in its lower end, a shaft journaled in said bearing and having its upper end screw-threaded, a nut turned on the said screw-threaded end of the shaft, an annular flange projecting from the under side of said nut and bearing on the upper end of said sleeve, and a stirrer carried by said shaft.

In testimony whereof I hereunto affix my signature in the presence of two witnesses.

RANSLAR R. CROSS.

Witnesses:
  GRANT BURROUGHS,
  F. H. SCHOTT.